United States Patent
Morales

(10) Patent No.: US 8,456,691 B2
(45) Date of Patent: Jun. 4, 2013

(54) DYNAMIC IMPOSITION BASED ON PERCEIVED PAGE VALUE

(75) Inventor: Javier A. Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1228 days.

(21) Appl. No.: 12/275,962

(22) Filed: Nov. 21, 2008

(65) Prior Publication Data

US 2010/0128311 A1 May 27, 2010

(51) Int. Cl.
*G06K 15/00* (2006.01)

(52) U.S. Cl.
USPC ..... 358/1.18; 358/1.13; 358/1.14; 707/999.1; 707/999.001; 707/999.102

(58) Field of Classification Search
USPC ......... 358/540, 450, 1.13–1.18, 1.9; 382/284, 382/209; 715/788, 789, 838; 707/999.001–102
See application file for complete search history.

(56) References Cited

U.S. PATENT DOCUMENTS

| | | | | |
|---|---|---|---|---|
| 7,340,676 B2* | 3/2008 | Geigel et al. | | 715/716 |
| 7,369,164 B2* | 5/2008 | Parulski et al. | | 348/231.99 |
| 7,502,137 B2* | 3/2009 | Morales et al. | | 358/1.18 |
| 7,822,744 B2* | 10/2010 | Isomura | | 707/731 |
| 8,055,080 B2* | 11/2011 | Isomura et al. | | 382/224 |
| 8,098,896 B2* | 1/2012 | Isomura et al. | | 382/106 |
| 8,149,437 B2* | 4/2012 | Mizutani et al. | | 358/1.15 |
| 2002/0078012 A1* | 6/2002 | Ryan et al. | | 707/1 |
| 2003/0117651 A1* | 6/2003 | Matraszek et al. | | 358/1.18 |
| 2008/0154943 A1* | 6/2008 | Dreyer et al. | | 707/102 |
| 2009/0303512 A1* | 12/2009 | Morales | | 358/1.12 |
| 2012/0307308 A1* | 12/2012 | Morales | | 358/1.15 |

* cited by examiner

*Primary Examiner* — Twyler Haskins
*Assistant Examiner* — Dennis Dicker
(74) *Attorney, Agent, or Firm* — Richard H. Krukar; Kermit D. Lopez; Luis M. Ortiz

(57) ABSTRACT

A dynamic imposition system provides for the printing of variable length documents onto a predefined number of pages. The more important pages in the document can be printed at their default size and resolution while less important pages can be automatically scaled down and printed at half size or less. The system automatically assigns ranks to the page descriptions in a print job based on each page's importance and then assigns one or more allowable impositions to each page description. The system then selects the imposition specifications that permit the imposition of the document onto a predetermined number of sheets. The document can then be imposed and printed in accordance with the selected imposition specifications.

22 Claims, 5 Drawing Sheets

DYNAMIC IMPOSITION BASED ON PERCEIVED PAGE VALUE

TECHNICAL FIELD

Embodiments are related to printing and more specifically to the prepress operation of imposition wherein the locations of document pages on sheets of media are determined.

BACKGROUND

Automated prepress operations can process a print job into an imposed document description that is ready for printing. A print job is usually the result of a user request for a document. The document is electronically described by a document description that includes a number of page descriptions. In large scale printing environments, the document pages are usually smaller than the sheets of media upon which they are printed. Imposition is a process, commonly automated, of converting page descriptions into sheet descriptions. A sheet description can contain many page descriptions along with each page's location on a sheet. Those skilled in the printing arts are familiar with imposition, automated imposition, and prepress operations in general.

Document descriptions and page descriptions contain page size specifications. For example, a letter size page either explicitly or implicitly contains an 8.5 inches by 11 inches size specification. Typically, all the document pages are printed to their specified size. However, there is a variety of documents that would benefit from dynamic resizing or imposition of individual pages. Methods and systems for dynamic resizing or imposition of individual document pages are needed.

BRIEF SUMMARY

Aspects of the embodiments address limitations and flaws in the prior art by dynamically resizing and imposing document pages based on the importance of each page.

It is therefore an aspect of the embodiments that a page ranking module assigns page ranks to the individual page descriptions within a document description. The page ranking module can be a rule based page ranking module that accepts page ranking rules from a user and then ranks pages accordingly.

It is also an aspect of the embodiments that an imposition specification module assigns an imposition specification to the individual page descriptions. Imposition rules can specify the impositions allowable for pages of any specific rank. The imposition specification module can then use the imposition rules to determine the allowable impositions for each ranked page. Production rules provide guidelines for the number of printed sheets desired. As such, the imposition module uses the production rules to individually select one of the allowable impositions as the imposition specification for each page description.

It is a further aspect of the embodiments that an imposition module imposes the page descriptions onto a sheet description in accordance with each page description's imposition specification. A printer can then print the sheets.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention

DETAILED DESCRIPTION OF THE INVENTION

The particular values and configurations discussed in these non-limiting examples can be varied and are cited merely to illustrate embodiments and are not intended to limit the scope of the invention.

A dynamic imposition system provides for the printing of variable length documents onto a predefined number of pages. The more important pages in the document can be printed at their default size and resolution while less important pages can be automatically scaled down and printed at half size or less. The system automatically assigns ranks to the page descriptions in a print job based on each page's importance and then assigns one or more allowable impositions to each page description. The system then selects the imposition specifications that permit the imposition of the document onto a predetermined number of sheets. The document can then be imposed and printed in accordance with the selected imposition specifications.

Figure 1:
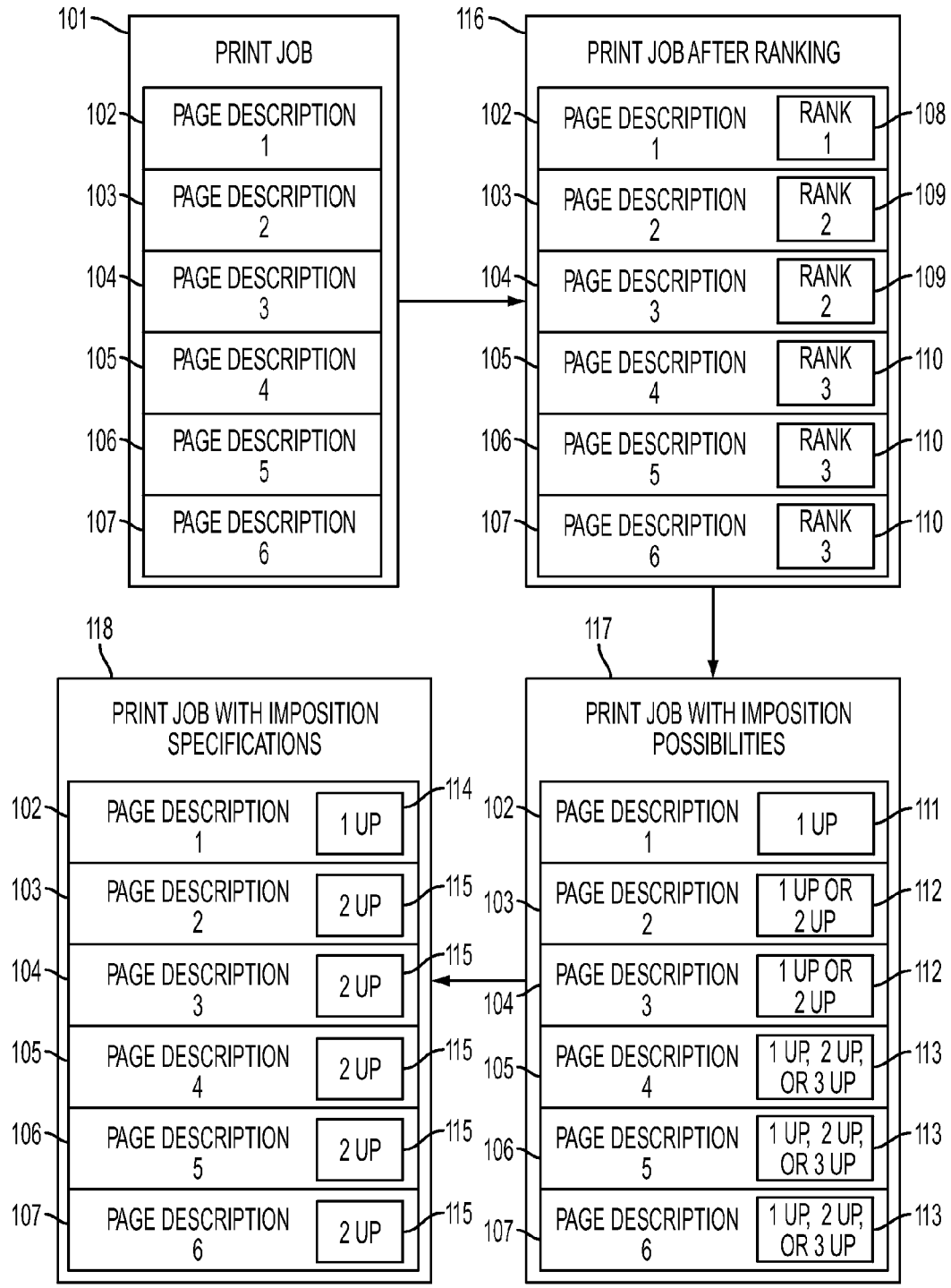
FIG. 1 illustrates a print job receiving imposition specifications in accordance with aspects of the embodiments.

FIG. 1 illustrates a print job 101 receiving imposition specifications 114, 115 in accordance with aspects of the embodiments. The system accepts a print job 101 containing a variable number of page descriptions. As illustrated in the example, there are 6 page descriptions labeled page description 1 102, page description 2 103, page description 3 104, page description 4 105, page description 5 106, and page description 6 107.

A ranking module 201 can accept the print job 101 and produce a print job after ranking 116. Page description 1 102 is assigned rank 1 108. Page description 2 103 is assigned rank 2 109. Page description 3 104 is assigned rank 2 109. Page description 4 105 is assigned rank 3 110. Page description 5 106 is assigned rank 3 110. Page description 6 107 is assigned rank 3 110.

An imposition specification module 207 assigns imposition possibilities based on the page ranks to produce a print job with imposition possibilities 117. A page printed 1 up consumes an entire side of one printed sheet. A page printed 2 up consumes a half of one side of a printed sheet. A page printed 3 up consumes a third of one side of a printed sheet. Page description 1 102 can be printed 1 up 111. Page description 2 103 can be printed 1 up or 2 up 112. Page description 3 104 can be printed 1 up or 2 up 112. Page description 4 105 can be printed 1 up, 2 up, or 3 up 113. Page description 5 106 can be printed 1 up, 2 up, or 3 up 113. Page description 6 107 can be printed 1 up, 2 up, or 3 up 113.

The imposition specification module then selects from the allowable impositions to produce a print job with imposition specifications 118. Page description 1 102 is to be printed 1 up 114. Page description 2 103 is to be printed 2 up 115. Page description 3 104 is to be printed 2 up 115. Page description 4 105 is to be printed 2 up 115. Page description 5 106 is to be printed 2 up 115. Page description 6 107 is to be printed 2 up 115.

Figure 2A:
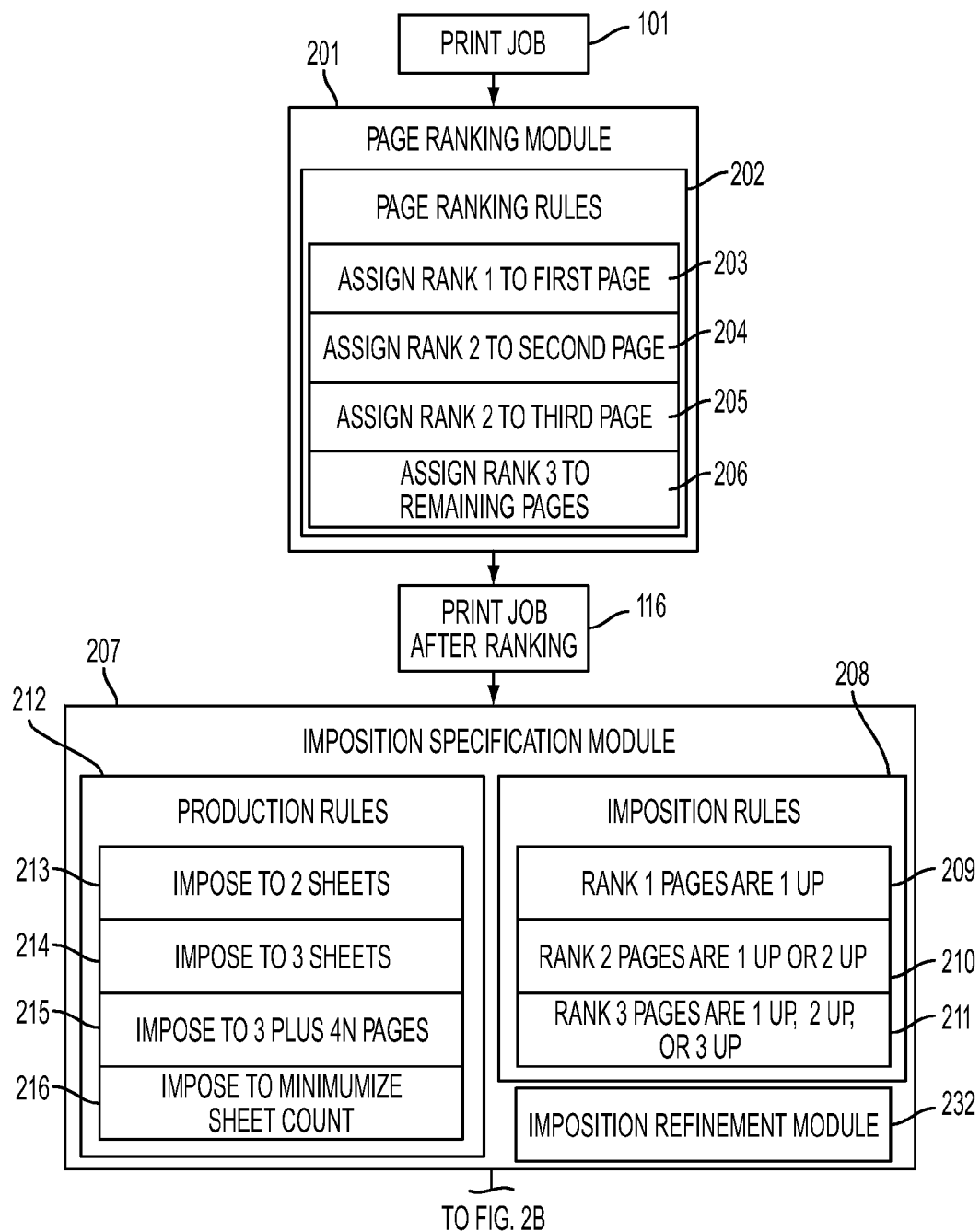
FIG. 2 illustrates a system dynamically imposing and printing a print job in accordance with aspects of the embodiments.
Figure 2B:
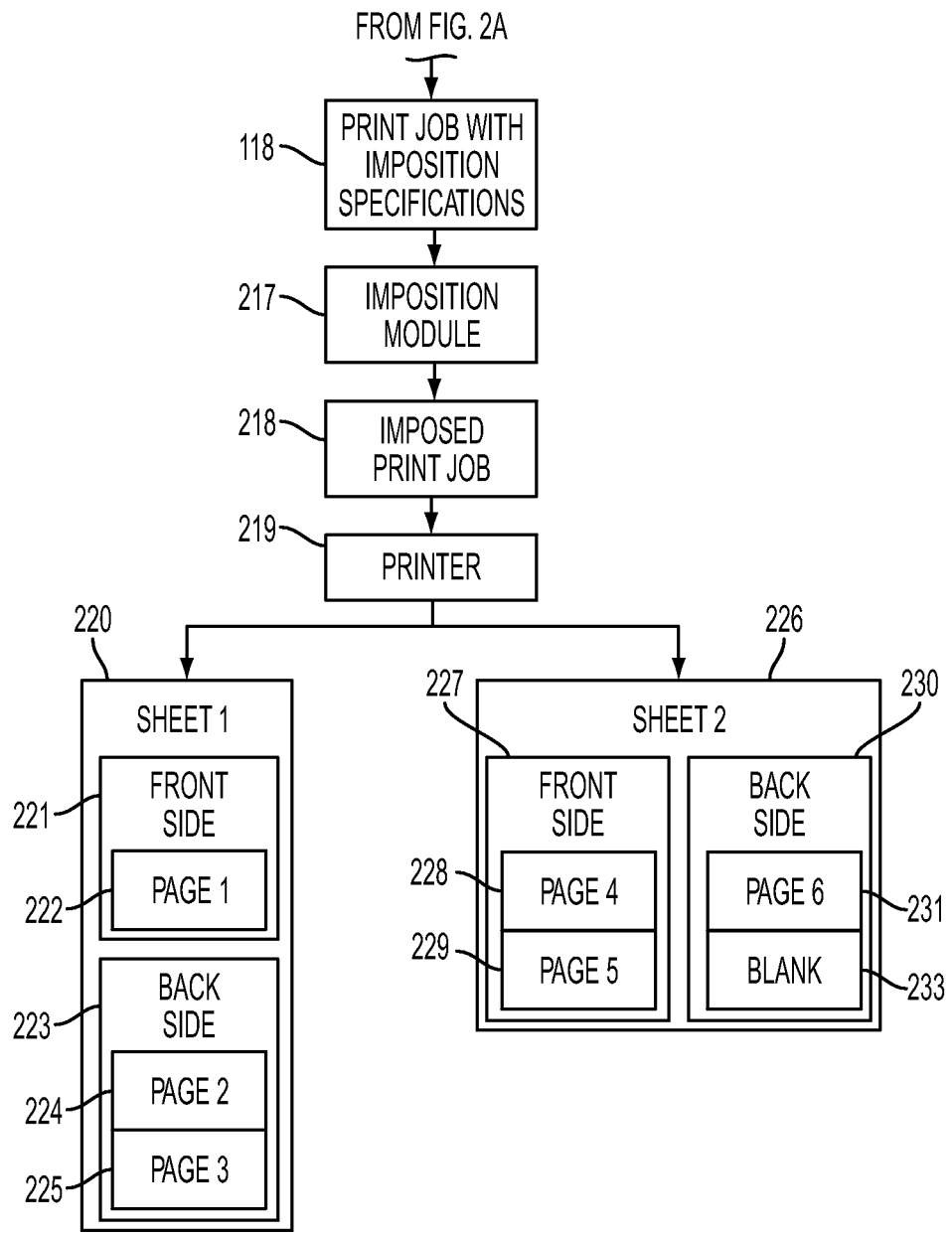

FIG. 2 illustrates a system dynamically imposing and printing a print job 101 in accordance with aspects of the embodiments. The page ranking module 201 accepts a print job 101 and assigns page ranks to the page descriptions. The illustrated page ranking module 201 is rule based although other embodiments can be used. As such, the page ranking module 201 uses page ranking rules 202. The first page is to be assigned rank 1 203. The second page is to be assigned rank 2 204. The third page is to be assigned rank 2 205. The remaining pages are to be assigned rank 3 206.

The imposition specification module 207 uses imposition rules 208 to assign allowable impositions to each page. Rank 1 pages are to be printed 1 up 209. Rank 2 pages can be printed 1 up or 2 up 210. Rank 3 pages can be printed 1 up, 2 up, or 3 up.

The imposition specification module 207 assigns imposition specifications in order to meet production rules 212. The production rules are consulted in order. First, the imposition specification module 207 attempts to select impositions that impose to 2 sheets 213. If that rule can't be met, then it attempts to impose to 3 sheets 214. It then attempts to impose to 3 plus 4N sheets 215 where N is an integer and 4N is an integral multiple of 4. As such, the third rule 215 sets the desired sheet count to 7, 11, 15, etc. The fourth rule, impose to minimize the sheet count 216, is inconsistent with the other three rules but is included to exemplify another type of production rule. Note that the production rules are stepped through in order and that the first one that can be met is the one that is used to produce the print job with imposition specifications 118.

The imposition module 217 inputs the print job with imposition specifications 118 and produces the imposed print job 218. The printer 219 prints the imposed print job 218 to produce printed sheet 1 220 and printed sheet 2 226. Printed sheet 1 220 has page 1 222 printed 1 up on the front side 221 while page 2 224 and page 3 225 are printed 2 up on the back side 223. Printed sheet 2 226 has page 4 228 and page 5 229 printed 2 up on the front side 227 while page 6 231 and a blank 233 are printed 2 up on the back side 230. Another possible imposition for sheet 2 226 would have page 4 228, page 5 229, and page 6 231 printed 3 up on the front side 227 while leaving the back side 230 blank. An imposition refinement module 232 selected the illustrated imposition to minimize white space. No rank 3 pages are printed 1 up because at least one rank 2 page is printed 2 up. As such, page 6 231 is printed 2 up and half the second sheet 226 back side 230 is blank 233.

Figure 3:
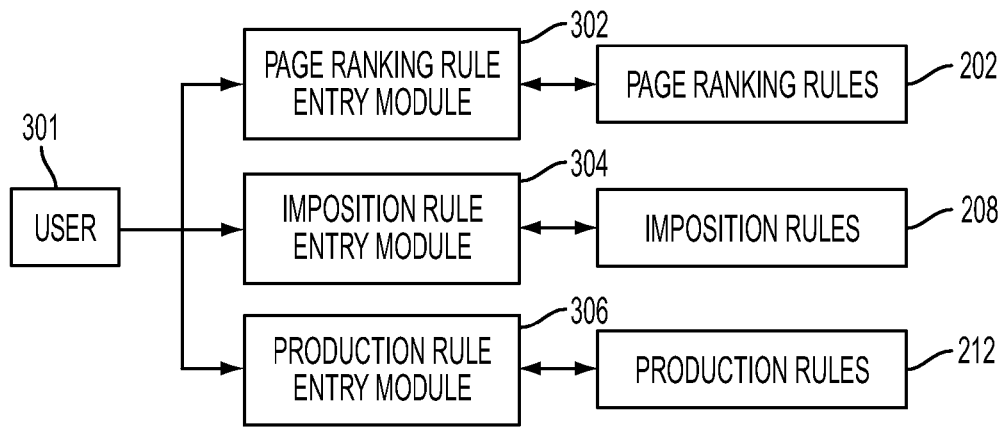
FIG. 3 illustrates a system accepting rules from a user in accordance with aspects of the embodiments.

FIG. 3 illustrates a system accepting rules from a user 301 in accordance with aspects of the embodiments. The user interacts with a page ranking rule entry module 302, an imposition rule entry module 304, and a production rule entry module 306. The page ranking rule entry module 302 is used to create, delete, and edit the page ranking rules 202. The imposition rule entry module 304 is used to create, delete, and edit the imposition rules 208. The production rule entry module 306 is used to create, delete, and edit the production rules 212.

Figure 4:
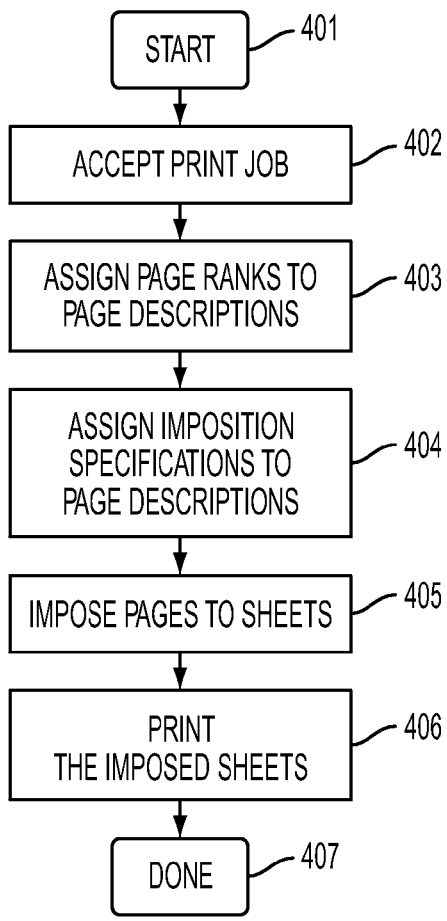
FIG. 4 illustrates a high level flow diagram of a print job being dynamically imposed and printed in accordance with aspects of the embodiments.

FIG. 4 illustrates a high level flow diagram of a print job being dynamically imposed and printed in accordance with aspects of the embodiments. After the start 401, the print job is accepted 402 for processing and page ranks assigned to the page descriptions 403. Imposition specifications 404 are assigned to the page descriptions 404 in accordance with production rules and imposition rules. The page descriptions are then imposed to produce sheet descriptions 405 that are then printed 406 before the process is done 407.

Figure 5:
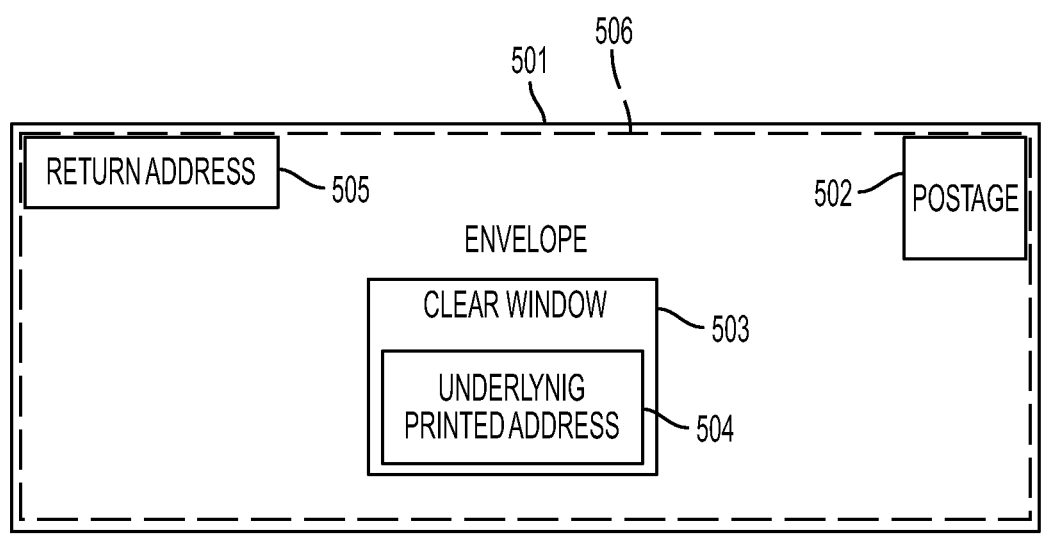
FIG. 5 illustrates an envelope containing a dynamically imposed and printed document in accordance with aspects of the embodiments.

FIG. 5 illustrates an envelope 501 containing a dynamically imposed and printed document 506 in accordance with aspects of the embodiments. The envelope 501 has a return address 505, clear window 503, and affixed postage 502. An underlying printed address 504 is visible through the clear window 503. The underlying printed address 504 is printed on one of the sheets of the dynamically imposed and printed document 506. The production rules for creating this particular dynamically imposed and printed document 506 called for 3 sheets or (3+4*N) sheets to meet the weight requirements for certain postal rates. The envelope plus 3 sheets weighs just under an ounce and can be mailed with one postal rate. Each additional 4 sheets add another ounce and incrementally more postage. The underlying printed address 504 is printed onto one of the pages of the dynamically imposed and printed document 506. The page description containing the address is given rank 1 to ensure that the underlying printed address 504 properly appears through the clear window 503.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. A system comprising:
a plurality of page ranks;
a plurality of imposition specifications;
a non-transitory page ranking module that accepts a print job comprising a plurality of page descriptions and assigns one and only one of the page ranks to each of the page descriptions;
a non-transitory imposition specification module that assigns at least one imposition possibility to each page description based on the page ranks wherein the at least one imposition possibility comprises information regarding which of the imposition specifications may be assigned to each one of the page descriptions and wherein a non-transitory imposition selection module assigns one of the imposition specifications to each page based on the imposition possibilities;

a non-transitory imposition module that produces an imposed print job by imposing the page descriptions in accordance with each page's imposition specification; and a printer that prints the imposed print job onto at least one sheet.

2. The system of claim 1 further comprising a plurality of production options that specify the imposition possibilities allowable for the page descriptions based on the page ranks.

3. The system of claim 2 wherein the non-transitory imposition specification module assigns the imposition specifications such that the least number of sheets are printed.

4. The system of claim 3 further comprising a non-transitory imposition refinement module that examines the imposition specifications assigned to the page descriptions and assigns a different one of the imposition specifications to at least one of the pages to thereby minimize white space within the at least one sheet.

5. The system of claim 2 wherein the non-transitory imposition specification module assigns imposition specifications such that a predefined number of sheets are printed.

6. The system of claim 5 further comprising a non-transitory imposition refinement module that examines the imposition specifications assigned to the page descriptions and assigns a different one of the imposition specifications to at least one of the pages to thereby minimize white space within the at least one sheet.

7. A system comprising:
a plurality of page ranking rules specifying the assignment of page ranks based on page number;
a plurality of imposition rules associating at least one allowable imposition with each of the page ranks and wherein at least one of the page ranks is associated with a plurality of allowable impositions;
at least one production rule specifying at least one allowable sheet count;
a non-transitory page ranking module that accepts a print job comprising a plurality of page descriptions and assigns one and only one of the page ranks to each of the page descriptions;
a non-transitory imposition specification module that assigns an imposition specification to each page description in accordance with the imposition rules, in accordance with the at least one production rule, and based on the page ranks;
a non-transitory imposition module that produces an imposed print job by imposing the page descriptions in accordance with each page's imposition specification; and
a printer that prints the imposed print job onto at least one sheet.

8. The system of claim 7, further comprising a non-transitory page ranking rule entry module wherein a user interacts with the non-transitory page ranking rule entry module to create, delete, and modify the page ranking rules.

9. The system of claim 7, further comprising a non-transitory imposition rule entry module wherein a user interacts with the non-transitory imposition rule entry module to create, delete, and modify the imposition rules.

10. The system of claim 7, further comprising a non-transitory production rule entry module wherein a user interacts with the non-transitory production rule entry module to create, delete, and modify the production rules.

11. The system of claim 7 wherein the non-transitory imposition specification module assigns imposition specifications to minimize the number of sheets that are printed.

12. The system of claim 11 further comprising a non-transitory imposition refinement module that examines the imposition specifications assigned to the page descriptions and assigns a different one of the imposition specifications to at least one of the pages to thereby minimize white space within the at least one sheet.

13. The system of claim 7 wherein the production rules comprise a production rule specifying a sheet count equaling a predefined number wherein the predefined number of sheets plus an envelope weigh less than one ounce.

14. The system of claim 7 wherein the production rules comprise a production rule specifying a sheet count equaling a predefined number wherein the predefined number of sheets plus an envelope weigh less than two ounces.

15. The system of claim 7 wherein the production rules comprise a production rule specifying a sheet count equaling a base integer plus an integral multiple of an incremental integer wherein the incremental integer is greater that one.

16. A method implemented by a printing system, the method comprising:
accepting a print job comprising a plurality of page descriptions;
assigning one and only one of a plurality of page ranks to each one of the page descriptions;
associating at least one of a plurality of allowable impositions with each page description based on the page rank assigned to each page description wherein at least one of the page descriptions is associated with a plurality of allowable impositions;
assigning one and only one of a plurality of imposition specifications to each of the page descriptions based on the allowable impositions, producing an imposed print job by imposing the print job in accordance with the imposition specifications; and
producing at least one printed sheet by printing the imposed print job.

17. The method of claim 16, wherein a plurality of production rules guide the assignment of the imposition specifications, wherein each of the production rules specifies a count of the at least one printed sheet, wherein the production rules are sequentially arranged, and wherein the system sequentially attempts to impose the print job in accordance with one of the sequence of production rules until successfully imposing the print job.

18. The method of claim 16 wherein the imposition specification module assigns the imposition specifications to minimize the number of printed sheets.

19. The method of claim 18 further comprising examining the imposition specifications assigned to the page descriptions and assigning a different one of the imposition specifications to at least one of the page descriptions to minimize white space within the at least one printed sheet.

20. The method of claim 16 wherein the imposition specification module assigns the imposition specifications such that a predefined number of sheets are printed.

21. The method of claim 20 further comprising examining the imposition specifications assigned to the page descriptions and assigning a different one of the imposition specifications to at least one of the page descriptions to minimize white space within the at least one printed sheet.

22. The method of claim 20, further comprising providing a production rule entry to a user wherein the user interacts with the production rule entry to adjust the predefined number of sheets.

* * * * *